US012732909B2

(12) United States Patent
Sohi et al.

(10) Patent No.: US 12,732,909 B2
(45) Date of Patent: Sep. 8, 2026

(54) ENERGY RESOURCE MANAGEMENT WITHIN A 5G RADIO ACCESS NETWORK

(71) Applicant: DISH Wireless L.L.C., Englewood, CO (US)

(72) Inventors: Gurpreet Sohi, Parker, CO (US); Sourabh Gupta, Ashburn, VA (US); Dhaval D. Mehta, Aldie, VA (US)

(73) Assignee: DISH Wireless L.L.C., Englewood, CO (US)

( * ) Notice: Subject to any disclaimer, the term of this patent is extended or adjusted under 35 U.S.C. 154(b) by 230 days.

(21) Appl. No.: 18/542,316

(22) Filed: Dec. 15, 2023

(65) Prior Publication Data

US 2025/0203506 A1 Jun. 19, 2025

(51) Int. Cl.
*H04W 52/02* (2009.01)

(52) U.S. Cl.
CPC ............................... *H04W 52/0206* (2013.01)

(58) Field of Classification Search
CPC ... H04W 24/08; H04W 4/70; H04W 52/0206; H04M 10/4257; H04L 41/147; H04L 43/065; H04L 43/0817; H04L 5/14; H04L 67/12; H04L 69/40
See application file for complete search history.

(56) References Cited

U.S. PATENT DOCUMENTS 9,277,497 B2 * 3/2016 Ansari ............. H04W 52/0206
11,410,219 B2 * 8/2022 Vega ...................... G06Q 50/06
11,785,435 B2 * 10/2023 Zhang ..................... H04W 4/70 370/329
11,894,679 B2 * 2/2024 Pathak .................... H04L 67/12
12,141,675 B1 * 11/2024 Duong ................... H04B 7/024
2021/0004265 A1 * 1/2021 Guim Bernat ........ G06F 9/4893
2021/0334914 A1 * 10/2021 Sadot ..................... G06N 20/00
2022/0232470 A1 * 7/2022 Valcarce Rial ......... H04L 41/16
2023/0378645 A1 11/2023 Tran
2024/0224175 A1 * 7/2024 Karaki .............. H04W 28/0221
2025/0253657 A1 * 8/2025 Tennant .................. H02J 3/004

FOREIGN PATENT DOCUMENTS

CN 101753612 6/2010
CN 109240223 1/2019
CN 112566226 3/2021

* cited by examiner

*Primary Examiner* — Bailor C Hsu
(74) *Attorney, Agent, or Firm* — Lowenstein Sandler LLP

(57) ABSTRACT

A method includes receiving, at one or more processing devices from application programming interfaces associated with one or more utility services providers, energy consumption data for each of a plurality of cell sites of a radio access network, accessing a machine learning model trained to determine, based on the energy consumption data, one or more operating parameters of the cell sites, the one or more operating parameters being indicative of corresponding usage levels of each of the plurality of cell sites, determining, based on an output of the machine learning model, a power resource configuration for the plurality of cell sites, specifying, for each of the plurality of cell sites, whether the corresponding cell site can be powered by a renewable energy source during a period of time in the future, and transmitting, via at least a subset of the APIs, a signal that identifies the power resource configuration.

20 Claims, 4 Drawing Sheets

200

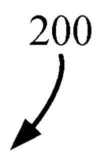

202 Receiving energy consumption data for each of a plurality of cell sites of a radio access network 204 Accessing a machine learning model trained to determine, based on the energy consumption data, one or more operating parameters of the cell sites, the one or more parameters being indicative of corresponding usage levels of each of the plurality of cell sites 206 Determining, based on an output of the machine learning model, a power resource configuration for the plurality of cell sites, the power resource configuration specifying, for each of the plurality of cell sites, whether the corresponding cell site can be powered by a renewable energy source during a future period of time 208 Transmitting a signal that identifies the power resource configuration, the signal including a recommendation to switch at least one of the plurality of cell sites from a non-renewable energy source to a renewable energy source

FIG. 2

ENERGY RESOURCE MANAGEMENT WITHIN A 5G RADIO ACCESS NETWORK

TECHNICAL FIELD

This specification relates to technology for analyzing energy usage data for cell sites within a radio access network (RAN).

BACKGROUND

Networks such as 5G cellular networks connect machines, objects, and devices over wireless RAN infrastructure.

SUMMARY

In some aspects, the subject matter described in this specification is embodied in methods that include the actions of receiving, at one or more processing devices from application programming interfaces (APIs) associated with one or more utility service providers, energy consumption data for each of a plurality of cell sites of a radio access network (RAN), accessing, by the one or more processing devices, a machine learning model trained to determine, based on the energy consumption data, one or more operating parameters of the cell sites, the one or more operating parameters being indicative of corresponding usage levels of each of the plurality of cell sites, determining, based on an output of the machine learning model, a power resource configuration for the plurality of cell sites, the power resource configuration specifying, for each of the plurality of cell sites, whether the corresponding cell site can be powered by a renewable energy source during a period of time in the future, and transmitting, via at least a subset of the APIs, a signal that identifies the power resource configuration, the signal including a recommendation to switch at least one of the plurality of cell sites from a non-renewable energy source to a renewable energy source.

In some implementations, the actions may include receiving at one or more processing devices from APIs associated with one or more utility service providers, energy consumption data for each of a plurality of cell sites of a RAN by receiving data that indicates whether energy consumed is non-renewable energy or renewable energy.

In some implementations, at least a first subset of the APIs associated with one or more utility service providers are configured to communicate with a control center associated with a utility service provider.

In some implementations, at least a second subset of the APIs associated with one or more utility service providers are configured to communicate directly with one or more smart meters located at one or more cell sites of the RAN.

In some implementations, the actions may include determining, based on an output of the machine learning model, a power resource configuration for the plurality of cell sites by determining a power resource configuration that would reduce a load on a particular grid within the RAN, where the particular grid includes a subset of the plurality of cell sites.

In some implementations, the one or more processors are configured to analyze the energy consumption data for each of the plurality of cell sites of the RAN to identify power consumption trends, trends in bands deployed by one or more RAN solutions associated with the plurality of cell sites, and cell site traffic trends.

In some implementations, the actions may further include transmitting, by the one or more processors, a control signal to a particular cell site, where the control signal is configured to implement a band configuration at the particular cell site.

In some implementations, the one or more operating parameters being indicative of corresponding usage levels of each of the plurality of cell sites include renewable energy usage, non-renewable energy usage, total daily energy consumption, site load information, daily cell site traffic trends, and daily band deployment trends.

In another general aspect, a system is provided. The system includes one or more computers and one or more storage devices on which are stored instructions that are operable when executed by the one or more computers, to cause the one or more computers to perform operations including receiving, at one or more processing devices from application programming interfaces (APIs) associated with one or more utility service providers, energy consumption data for each of a plurality of cell sites of a radio access network (RAN), accessing, by the one or more processing devices, a machine learning model trained to determine, based on the energy consumption data, one or more operating parameters of the cell sites, the one or more operating parameters being indicative of corresponding usage levels of each of the plurality of cell sites, determining, based on an output of the machine learning model, a power resource configuration for the plurality of cell sites, the power resource configuration specifying, for each of the plurality of cell sites, whether the corresponding cell site can be powered by a renewable energy source during a period of time in the future, and transmitting, via at least a subset of the APIs, a signal that identifies the power resource configuration, the signal including a recommendation to switch at least one of the plurality of cell sites from a non-renewable energy source to a renewable energy source.

Implementations of the system can include one or more of the following features. In some implementations, the actions may include receiving, at one or more processing devices from APIs associated with one or more utility service providers, energy consumption data for each of a plurality of cell sites of a RAN by receiving data that indicates whether energy consumed is non-renewable energy or renewable energy.

In some implementations, at least a first subset of the APIs associated with one or more utility service providers are configured to communicate with a control center associated with a utility service provider.

In some implementations, at least a second subset of the APIs associated with one or more utility service providers are configured to communicate directly with one or more smart meters located at one or more cell sites of the RAN.

In some implementations, the actions may include determining, based on an output of the machine learning model, a power resource configuration for the plurality of cell sites by determining a power resource configuration that would reduce a load on a particular grid within the RAN, where the particular grid includes a subset of the plurality of cell sites.

In some implementations, the one or more processors are configured to analyze the energy consumption data for each of the plurality of cell sites of the RAN to identify power consumption trends, trends in bands deployed by one or more RAN solutions associated with the plurality of cell sites, and cell site traffic trends.

In some implementations, the actions may further include transmitting, by the one or more processors, a control signal to a particular cell site, where the control signal is configured to implement a band configuration at the particular cell site.

In some implementations, the one or more operating parameters being indicative of corresponding usage levels of each of the plurality of cell sites include renewable energy usage, non-renewable energy usage, total daily energy consumption, site load information, daily cell site traffic trends, and daily band deployment trends.

In another general aspect, a non-transitory computer-readable medium is provided. The non-transitory computer-readable medium stores instructions that are executable by a processing device, and upon such execution cause the processing device to perform operations. The operations include receiving, at one or more processing devices from application programming interfaces (APIs) associated with one or more utility service providers, energy consumption data for each of a plurality of cell sites of a radio access network (RAN), accessing, by the one or more processing devices, a machine learning model trained to determine, based on the energy consumption data, one or more operating parameters of the cell sites, the one or more operating parameters being indicative of corresponding usage levels of each of the plurality of cell sites, determining, based on an output of the machine learning model, a power resource configuration for the plurality of cell sites, the power resource configuration specifying, for each of the plurality of cell sites, whether the corresponding cell site can be powered by a renewable energy source during a period of time in the future, and transmitting, via at least a subset of the APIs, a signal that identifies the power resource configuration, the signal including a recommendation to switch at least one of the plurality of cell sites from a non-renewable energy source to a renewable energy source.

Other features and advantages of the description will become apparent from the following description, and from the claims. Unless otherwise defined, the technical and scientific terms used herein have the same meaning as commonly understood by one of ordinary skill in the art to which this invention belongs.

BRIEF DESCRIPTION OF THE DRAWINGS

FIG. 2 is a flowchart of a process for transmitting a signal that identifies a power resource configuration.

Like reference numbers and designations in the various drawings indicate like elements.

DETAILED DESCRIPTION

Figure 1A:
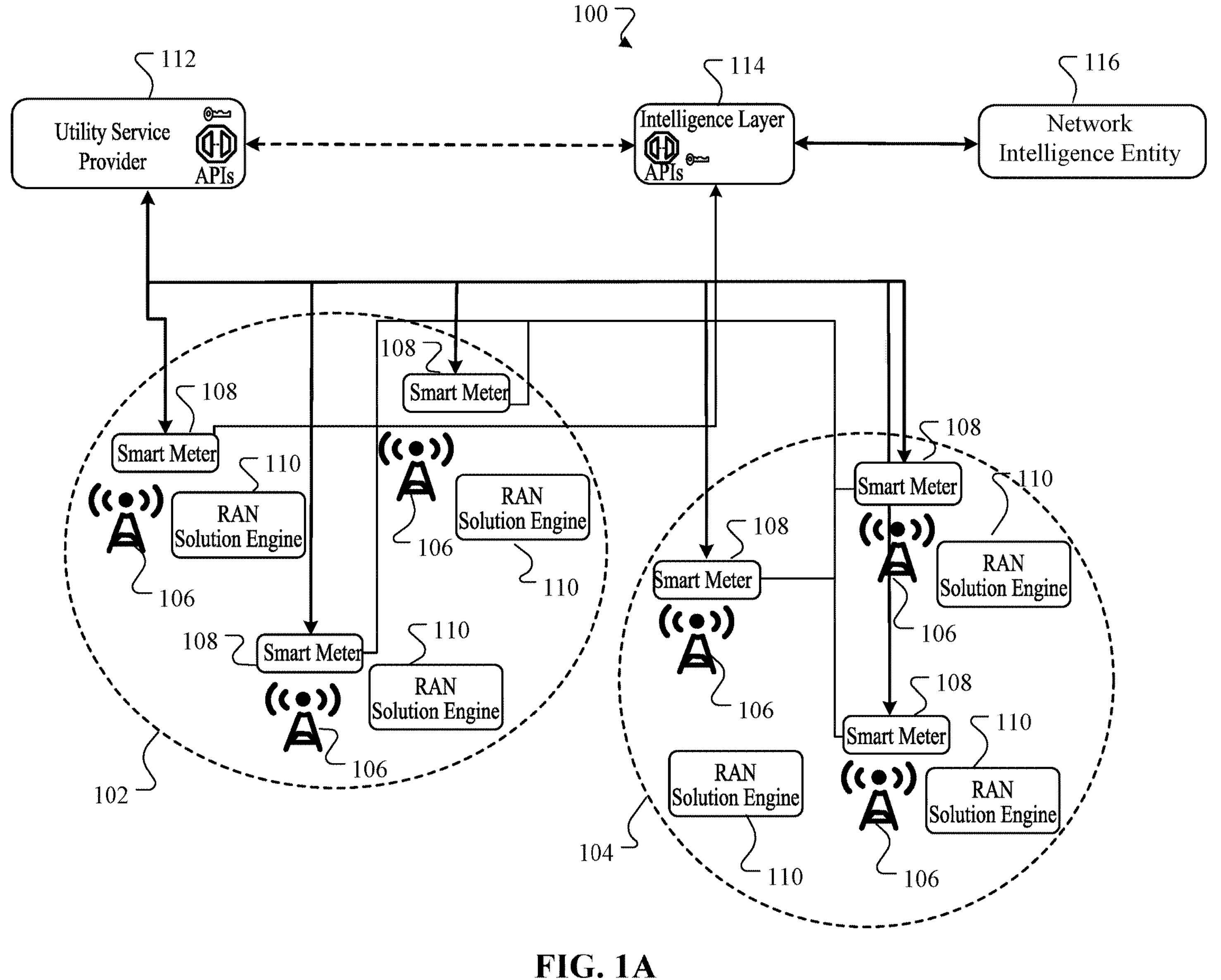
FIGS. 1A and 1B are an example RAN network.

Telecommunications and other utility operations use a considerable amount of the world's electricity supply. As these industries continue to grow rapidly, the power consumption associated is predicted to continue to increase. These operations also generate large amounts of carbon dioxide ($CO_2$) gas which contributes significantly to global warming. Developing new and improved ways to reduce the energy consumption of telecommunications and other utility operations would help to reduce the overall carbon footprint of such operations, and thereby assist in combating global atmospheric $CO_2$ levels and global warming.

This document describes technology for monitoring energy usage at various RAN resources, for example, to facilitate prioritization of renewable energy sources over fossil fuel-based energy sources. While using renewable energy sources for powering RAN entities such as cell sites is preferable from a sustainability standpoint, practical limitations of renewable energy sources may not allow using such sources at all times. For example, during periods of high network traffic, the energy usage at a cell site may reach a level that cannot be fully met by renewable energy sources. On the other hand, the energy requirements during periods of relatively lower network traffic may be fully met by renewable energy sources, and it may be desirable to limit use of fossil fuel-based sources during those periods. The technology described herein allows for tracking (and potentially predicting) energy usage at RAN entities such that renewable energy sources can be utilized whenever it is feasible to do so without affecting quality of service (QOS) provided by the corresponding entities. In some implementations, one or more trained machine-learning models can be leveraged to model/predict energy usage at such entities under various conditions such that power sources can be intelligently selected to substantially optimize usage of renewable energy sources without compromising on QoS.

In some implementations, the techniques described herein utilize a network intelligence entity, for example, a RAN Intelligent Controller (RIC), as a component of a RAN architecture to analyze energy usage data received from the cell sites within a network supported by the RAN architecture. The RAN architecture may include one or more cell sites across multiple service grids of a telecommunication network, a RAN solution engine associated with a service provider, and an intelligence layer that includes a cloud software component in communication with a non-real-time application. The intelligence layer receives energy usage data, which provides a detailed energy consumption report for each of the plurality of cell sites within the network over a period of time, and utilizes the received energy usage data to train a machine learning model that reflects the daily patterns of the energy usage for the various cell sites under various conditions. For example, the trained machine learning model may reflect the energy usage patterns for various cell sites for different times of a day, and can therefore be used to predict energy usage for different network conditions that vary as a function of time. The machine learning model can be trained and retrained based on the intelligence layer continuously receiving energy consumption data over time. For example, a machine learning model can be trained via a supervised learning process using a large corpus of training energy consumption data from a plurality of cell sites.

In some implementations, the technology described herein provides an energy source management recommendation to a utility company based on the trends in the energy consumption of the cell sites within the network and the trends in the network load. For example, by leveraging technology described herein, the system can determine an energy source configuration for the plurality of cell sites which would reduce the overall energy consumption of the plurality of sites. For example, the system can determine that switching one or more cell sites from a non-renewable energy source to a renewable energy source would reduce the overall energy consumption of the sites.

The technology described in this document provides the advantage of determining energy management configurations for multiple cell sites within a network based not only on the historical energy consumption data associated with a particular site, but also on the network load of the network that supports the multiple cell sites. As such, by leveraging the patterns identified in the network load data, the system can identify changes in the resource management that can be made at each individual cell site, in addition to changes that can be made to the configuration of the network that supports the cell site to provide a comprehensive energy management recommendation.

Figure 1B:
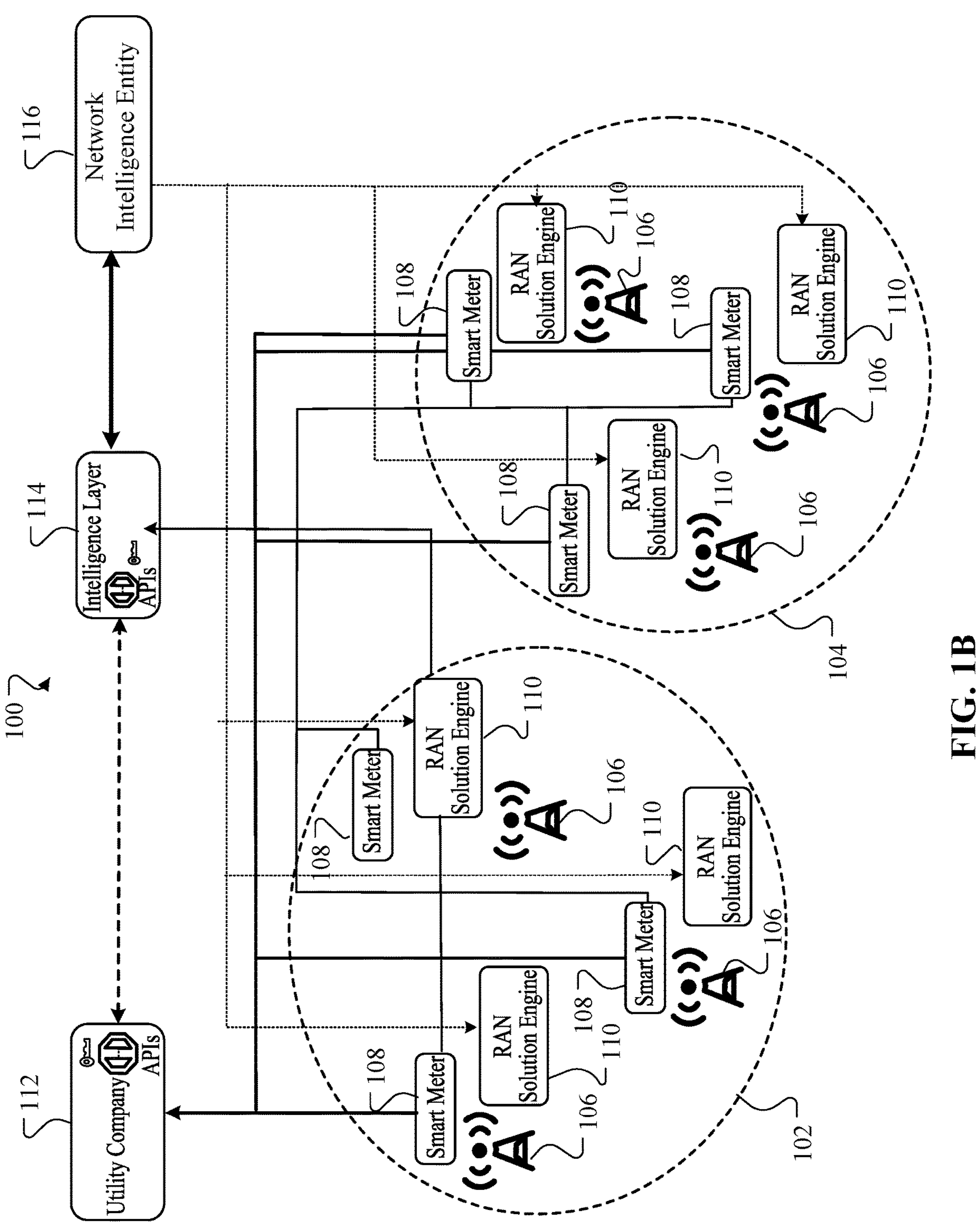

FIGS. 1A and 1B depict an example RAN system 100 for analyzing the energy consumption data of a plurality of cell sites within a network supported by the RAN architecture. The system 100 may include one or more service grids 102 and 104, one or more cell sites 106, one or more smart meters 108, a RAN solution engine 110, a utility service provider 112, an intelligence layer 114, and a network intelligence entity 116.

The one or more service grids 102 and 104 may each include a plurality of cell sites 106. As illustrated in FIG. 1, service grid 102 services three cell sites and service grid 104 services three different cell sites. The number of cell sites 106 serviced by each service grid 102 and 104 may vary, and each service grid 102 and 104 may include up to any number of cell sites 106. A cell site 106 may include a telecommunications tower that is managed by the utility service provider 112. Each of the one or more cell sites 106 may include mechanisms that allow for a power source associated with the cell site 106 to be switched between a renewable and a non-renewable energy source. For example, the cell site 106 may include one or more solar panels mounted to the site 106 which can provide a solar energy source. In this example, the cell site 106 may include a mechanism that allows the site to switch from the power grid to the solar energy source.

Each of the one or more cell sites 106 may be equipped with a smart meter 108. A smart meter 108 is configured to measure and store the energy consumption data of the associated cell site 106. The energy consumption data captured by the one or more smart meters 108 is communicated to the utility service provider 112. In some implementations, the energy consumption data captured by the one or more smart meters 108 may be periodically communicated to the utility service provider 112. For example, the energy consumption data may be communicated to the utility service provider 112 hourly, daily, monthly, or any other suitable period of time. In other implementations, the energy consumption data captured by the one or more smart meters 108 may be communicated to the utility service provider 112 in real-time. In other implementations, the energy consumption data captured by the one or more smart meters 108 may be communicated directly to the intelligence layer 114. In these implementations, the energy consumption data may be communicated periodically or in real-time.

Based on the energy consumption data received from the one or more smart meters 108, the utility service provider 112 can determine the energy usage and load information for the each of the one or more cell sites 106. The energy consumption data received from the one or more cell sites 106 may include sufficient data for the utility service provider 112 to determine power/energy usage and load data for each of the one or more cell sites 106 for different times of the day. The energy consumption data may also include details which indicate whether the energy used by a particular cell site 106 was from a renewable or non-renewable source. One or more processing devices associated with the utility service provider 112 may accumulate the energy consumption data received over time. The received energy consumption data may be stored in one or more databases associated with the one or more processing devices of the utility service provider 112.

As illustrated in FIG. 1A, the utility service provider 112 is in communication with the intelligence layer 114. The one or more processing devices associated with the utility service provider 112 may communicate the accumulated energy consumption data as a detailed energy consumption report to the intelligence layer 114. The detailed energy consumption report may be communicated to the intelligence layer 114 via an application programming interface (API). In some implementations, the one or more processing devices at the utility service provider 112 may communicate the detailed energy consumption report via one or more APIs to the intelligence layer 114. The detailed energy consumption report may include energy consumption data associated with each of one or more cell sites 106 down to a granularity of 15 minutes, that is, the report may include details of the energy consumed by a cell site 106 for each 15-minute block of the day. In some implementations, the report may include energy consumption data down to a granularity of 1 minute. The granularity of the detailed energy consumption report may be configurable. For example, the utility service provider 112 may provide a report to the intelligence layer 114 for a cell site 106 with a 15-minute granularity, and may provide a report to the intelligence layer 114 for a second cell site 106 with an hour granularity.

The duration of the detailed energy consumption report may also be configurable. For example, the report may include energy consumption data collected over the past day, the past month, the past two months, the past six months, or any other suitable time period. The detailed report may include data that identifies the type of morphology being serviced by a particular cell site 106, for example the data can identify which of the one or more cell sites 106 are servicing hot spots, or mission critical services. The detailed report may identify the traffic at each of the one or more cell sites 106 at different times of the day. For example, the report may identify which of the one or more cell sites 106 are high traffic sites and which are low traffic sites.

The intelligence layer 114 receives the energy consumption report data from the utility service provider 112, and the one or more processing devices at the intelligence layer 114 may utilize the received data to generate a machine learning model that reflects the energy consumption usage of the one or more cell sites 106 over time. The machine learning model may reflect how each of the one or more cell sites 106 utilize energy throughout the day. The machine learning model may be trained based on the energy consumption data for each interval of granularity, the site traffic patterns for each of the one or more cell sites 106, the type of morphologies being serviced by each of the one or more cell sites 106, the type of services offered by the one or more sites 106, the operating capacity of each of the one or more sites, for example, the number of frequency bands being used at each site 106, and whether the site is operating at 50% or 75%. In some implementations, the machine learning model can be trained via a supervised learning process using a large corpus of training energy consumption data. The one or more processing devices at the intelligence layer 114 may use energy consumption data periodically received from the utility service provider 112 to continuously update and retrain the machine learning model on a periodic basis. The machine learning model generated by the intelligence layer 114 may be used to predict for a future time, the energy consumption of the one or more cell sites 106 within the RAN 100.

The intelligence layer 114 may also be in communication with the network intelligence entity 116, as illustrated in FIGS. 1A and 1B. The network intelligence entity 116 may be a non-real-time RIC application that may be employed by a telecommunications operator. In some implementations, the network intelligence entity 116 and the intelligence layer 114 may be maintained by the same entity. As illustrated in FIG. 1B, each of the one or more cell sites 106 may be supervised by a RAN engine 110 operated by the telecommunications operator. The network intelligence entity 116 may receive real-time network data from the RAN solution engine 110. The real-time network data received from the RAN solution engine 110 may identify the service data associated with the one or more cell sites 106 within the RAN 100. For example, the real-time data may identify the one or more services being offered by the one or more cell sites 106, the loading on the network, the site traffic patterns for each of the one or more cell sites 106, the type of morphologies being serviced by each of the one or more cell sites 106, the operating capacity of each of the one or more sites 106, and any other network-related data. The real-time network data received by the network intelligence entity 116 may be communicated to the intelligence layer 114, and may be used to train the machine learning model, as described above. The machine learning model may be retrained and updated periodically based on the continuous real-time network data received from the RAN solution engine 110 within the RAN 100.

The intelligence layer 114 may utilize the generated machine learning model to determine an optimal configuration that would reduce the energy consumption of the plurality of cell sites 106 within the RAN 100. The optimal configuration may include one or more recommended steps that when implemented by the utility service provider 112 and/or the telecommunications operator may cause the overall energy consumption of the plurality of cell sites 106 within the RAN 100 to be reduced. For example, the optimal configuration may include a recommendation that identifies a subset of the plurality of cell sites 106 that can be switched from a non-renewable energy source to a renewable energy source for a period of the day. For another example, the optimal configuration may include a recommendation that identifies each of the plurality of cell sites 106 included in a particular service grid 102 or 104 to be switched from a non-renewable to a renewable energy source. Each of the plurality of cell sites 106 identified may include a mechanism which allows the site 106 to switch from the power grid to the renewable energy source. For example, the plurality of cell sites 106 may include hydroelectricity or wind energy sources.

In addition, the optimal configuration may identify one or more steps that may be executed by network intelligence entity 116 to reduce the energy consumption on the network side. For example, the optimal configuration may identify one or more cell sites 106 which may have some cells or frequency bands temporarily switched off for a period of the day to reduce the overall load on a particular grid. In some implementations, the intelligence layer 114 may identify the one or more cell sites 106 that operate at a high capacity at a particular time of day and may determine steps that may be taken to reduce the capacity on the identified one or more cell sites 106. For example, the intelligence layer 114 may determine that traffic typically processed by a particular cell site 106 could be transferred to a nearby cell site that has a lower capacity at the given time. The one or more recommendations identified in the optimal configuration may be determined based not only on the goal of reducing the overall power consumption of the one or more cell sites 106 within the RAN 100, but may also consider the quality of service offered to end users within the network. As such, the intelligence layer 114 may propose recommendations that do not lower the quality of service provided within the RAN 100. In some implementations, the network intelligence entity 116 may compute how much energy reduction it will produce based on the identified changes, and the network entity may add or remove cell sites 106 which need to be turned down temporarily to produce the reduction.

In some implementations, the intelligence layer 114 may communicate the proposed optimal configuration recommendation, via an API, to the utility service provider 112. In these implementations, the intelligence layer 114 may communicate with the network intelligence entity 116 to cause the network intelligence entity 116 to automatically implement the changes to the network based on the recommendations. The utility service provider 112 may decide to implement the suggested changes by communicating with the one or more smart meters 108 at the one or more cell sites 106. In other implementations, the intelligence layer 114 may automatically implement the steps of the optimal configuration on the network side based on the changes identified. In these implementations, the intelligence layer 114 may communicate directly with the one or more cell sites 106 to implement the recommendations. For example, the intelligence layer 114 may communicate with a subset of the one or more cell sites 106, instructing the sites to switch from a non-renewable energy source to a renewable energy source.

In some implementations, the utility service provider 112 may receive energy consumption data from one or more different customers. For example, the one or more different customers may be end users that utilize the one or more cell sites 106 within the RAN 100. In these implementations, the utility service provider 112 may offer incentives to the one or more customers to keep energy consumption low. For example, the utility service provider 112 may offer reduced energy costs to customers that opt into reporting their energy consumption data to the intelligence layer 114.

FIG. 2 illustrates an exemplary process 200 for transmitting a signal that identifies a power resource configuration. The following describes the process 200 as being performed by components of the system 100 described above with reference to FIGS. 1A and 1B. However, the process 200 may be performed by other systems and configurations. Briefly, the process 200 may include receiving energy consumption data for each of a plurality of cell sites of a radio access network (RAN) (202), accessing a machine learning model trained to determine, based on the energy consumption data, one or more operating parameters of the cell sites, the one or more parameters being indicative of corresponding usage levels of each of the plurality of cell sites (204), determining, based on an output of the machine learning model, a power resource configuration for the plurality of cell sites, the power resource configuration specifying, for each of the plurality of cell sites, whether the corresponding cell site can be powered by a renewable energy source during a period of time in the future (206), and determining, based on an output of the machine learning model, a power resource configuration for the plurality of cell sites, the power resource configuration specifying, for each of the plurality of cell sites, whether the corresponding cell site can be powered by a renewable energy source during a future period of time (208).

In more detail, process 200 may include receiving energy consumption data for each of a plurality of cell sites 106 of a radio access network (RAN) (202). For example, this may correspond to one or more processing devices of an intelligence layer 114 receiving energy consumption data from a plurality of cell sites 106 within a RAN. A utility service provider 112 may use smart meters 108 to monitor the energy consumption of the plurality of cell sites 106 that are serviced by the provider 112. Each of the plurality of cell sites 106 within the RAN may be equipped with a smart meter 108 that monitors the energy consumption of the site 106.

The one or more smart meters 108 may communicate energy consumption data to one or more processing devices associated with the utility service provider 112. The one or more processing devices associated with the utility service provider 112 may use an application programming interfaces (APIs) to communicate the energy consumption data received from the one or more smart meters 108 to the one or more processing devices associated with the intelligence layer 114 on a periodic basis. The energy consumption data received from the one or more smart meters 108 may include energy consumption data for each 15-minute increment of the day. In some examples, the energy consumption data received from the one or more smart meters 108 may include energy consumption data for any appropriate time interval. In some implementations, the energy consumption data is communicated in real time. For example, the energy consumption data is communicated to the utility service provider 112 every 15 minutes, and the utility service provider 112 communicates the energy consumption data via APIs to the intelligence layer 114 in real-time. In other implementations, the energy consumption data is communicated to the utility service provider 112, and the utility service provider 112 communicates a report for power consumption data collected over a particular period to the intelligence layer 114. For example, the utility service provider 112 may communicate a report of energy consumption data accumulated over a month to the intelligence layer 114.

The data received by the intelligence layer 114 may also include network data which is communicated from a RAN solution engine 110 associated with a cell site 106 to an network intelligence entity 116 in communication with the intelligence layer 114. The network data specifies the network resources associated with the cell site 106. For example, the network data may include site load information, cell site traffic trends, trends in the number of bands deployed by cell sites, band configuration, and other network data.

The process 200 may include accessing a machine learning model trained to determine, based on the energy consumption data, one or more operating parameters of the cell sites, the one or more parameters being indicative of corresponding usage levels of each of the plurality of cell sites (204). For example, this may correspond to the one or more processing devices at the intelligence layer 114 generating a machine learning model that reflects the energy consumption usage of the one or more cell sites 106 during the course of a day. The one or more operating parameters of the cell sites 106 may include whether the cell site 106 is operating based on renewable or non-renewable energy. The one or more operating parameters of the cell sites 106 may also include parameters which are associated with the network configuration. In more detail, a RAN solution engine 110 may be associated with each of the one or more cell sites 106 within the RAN 100, and may communicate real-time network data to the network intelligence entity 116. The network intelligence entity 116 may be in communication with the intelligence layer 114, and may communicate network data that identifies the services being offered by each of the plurality of cell sites 106 during the course of the day, the loading on the network, the site traffic patterns for each of the plurality of cell sites 106, the type of morphologies being serviced by each of the one or more cell sites 106, and the operating capacity of each of the one or more cell sites 106.

The process 200 may include determining a power resource configuration for the plurality of cell sites based on an output of the machine learning model, the power resource configuration specifying for each of the plurality of cell sites, whether the corresponding cell site can be powered by a renewable energy source during a period of time in the future (206). For example, this may correspond to the intelligence layer 114 determining that the energy consumption can be reduced by switching one or more cell sites 106 to be powered by a renewable energy source during a particular time of day. The intelligence layer 114 leverages the energy consumption data as well as the network load data received from the RAN solution engine 110 at the network intelligence entity 116 to generate a comprehensive power resource configuration that (1) provides a recommendation which can be employed by the utility service provider 112 at the one or more cell sites 106, and (2) which implements changes on the network configuration to ensure that the overall energy consumption throughout the network would be reduced.

The process 200 may include transmitting a signal that identifies the power resource configuration via at least a subset of APIs (208). For example, this may correspond to the intelligence layer 114 communicating a recommendation to a utility service provider 112 to switch at least one of the plurality of cell sites 106 from a non-renewable energy source to a renewable energy source.

Figure 3:
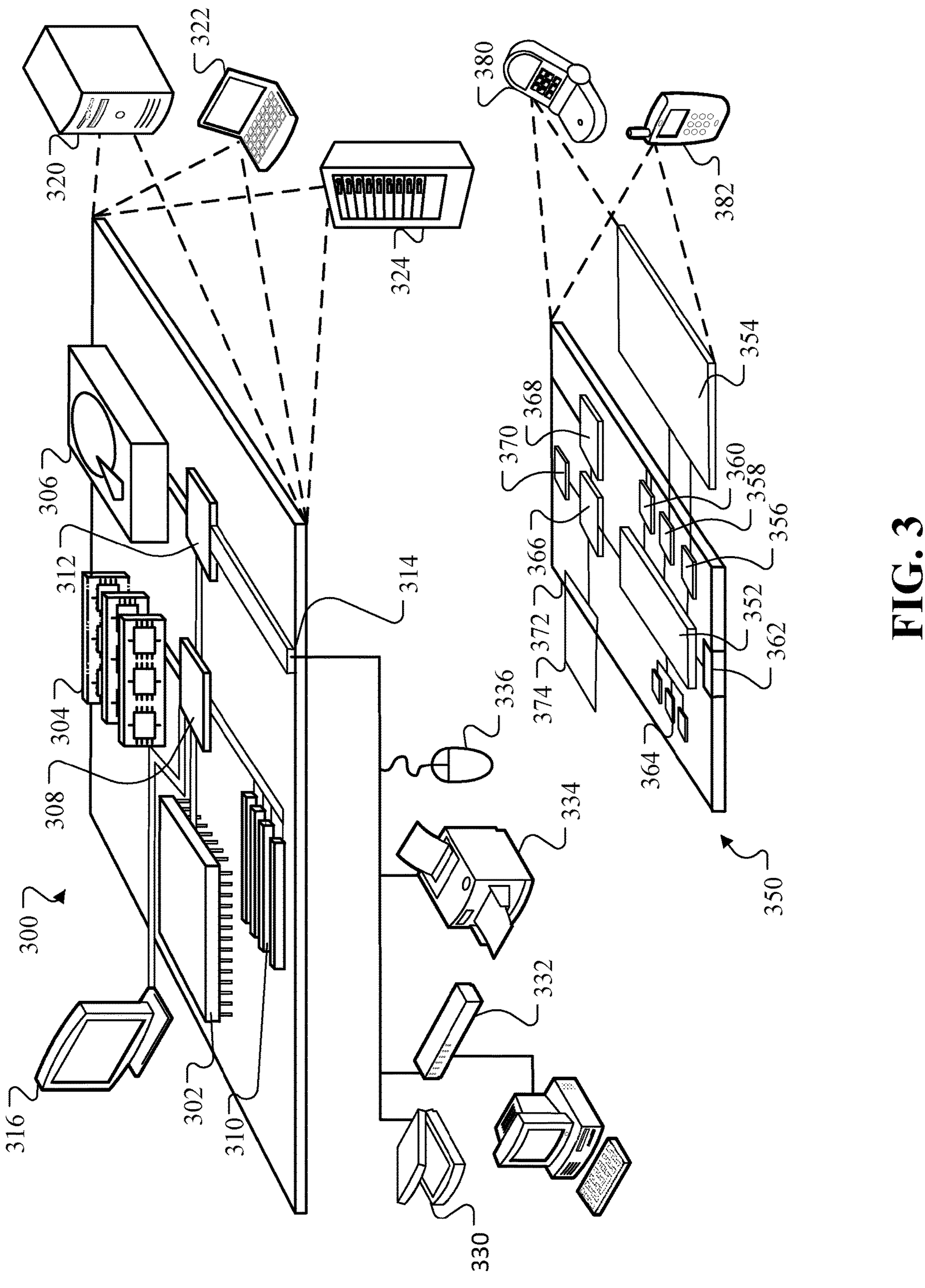
FIG. 3 is a diagram illustrating an example of a computing environment.

FIG. 3 shows an example of a computing device 300 and a mobile computing device 350 that can be employed to execute implementations of the present disclosure. For example, the RAN entities described above can be part of a 5G Open RAN (O-RAN) architecture deployed in a cloud computing environment, and computing devices 300 (and/or mobile devices 350) may be used to implement various portions of such a cloud computing environment.

The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting. The computing device 300 and/or the mobile computing device 350 can be user devices that form at least a portion of a system that runs one or more software applications to implement the technology described herein. The computing device 300 and/or the mobile computing device 350 can also be used to perform the process 200 described and shown above in relation to FIG. 2.

The computing device 300 includes a processor 302, a memory 304, a storage device 306, a high-speed interface 308, and a low-speed interface 312. In some implementations, the high-speed interface 308 connects to the memory 304 and multiple high-speed expansion ports 310. In some implementations, the low-speed interface 312 connects to a low-speed expansion port 314 and the storage device 306. Each of the processor 302, the memory 304, the storage device 306, the high-speed interface 308, the high-speed expansion ports 310, and the low-speed interface 312, are interconnected using various buses, and may be mounted on a common motherboard or in other manners as appropriate. The processor 302 can process instructions for execution within the computing device 300, including instructions stored in the memory 304 and/or on the storage device 306 to display graphical information for a graphical user interface (GUI) on an external input/output device, such as a display 316 coupled to the high-speed interface 308. In other implementations, multiple processors and/or multiple buses may be used, as appropriate, along with multiple memories and types of memory.

The memory 304 stores information within the computing device 300. In some implementations, the memory 304 is a volatile memory unit or units. In some implementations, the memory 304 is a non-volatile memory unit or units. The memory 304 may also be another form of a computer-readable medium, such as a magnetic or optical disk.

The storage device 306 is capable of providing mass storage for the computing device 300. In some implementations, the storage device 306 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 302, perform one or more methods, such as those described above. The instructions can also be stored by one or more storage devices, such as computer-readable or machine-readable media, such as the memory 304, the storage device 306, or memory on the processor 302.

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards. In implementations, the low-speed interface 312 is coupled to the storage device 306 and the low-speed expansion port 314. The low-speed expansion port 314, which may include various communication ports (e.g., Universal Serial Bus (USB), Bluetooth, Ethernet, wireless Ethernet) may be coupled to one or more input/output devices. The input/output devices may also be coupled to the low-speed expansion port 314 through a network adapter. Such network input/output devices may include, for example, a switch or router.

The computing device 300 may be implemented in a number of different forms, as shown in FIG. 3. For example, it may be implemented as a standard server 320, or multiple times in a group of such servers. In addition, it may be implemented in a personal computer such as a laptop computer 322. It may also be implemented as part of a rack server system 324.

In some implementations, components from the computing device 300 may be combined with other components in a mobile device, such as a mobile computing device 350. Each of such devices may contain one or more of the computing device 300 and the mobile computing device 350, and an entire system may be made up of multiple computing devices communicating with each other.

The mobile computing device 350 includes a processor 352; a memory 334; an input/output device, such as a display 354; a communication interface 333; and a transceiver 338; among other components. The mobile computing device 350 may also be provided with a storage device, such as a micro-drive or other device, to provide additional storage. Each of the processor 352, the memory 334, the display 354, the communication interface 333, and the transceiver 338, are interconnected using various buses, and several of the components may be mounted on a common motherboard or in other manners as appropriate.

The processor 352 may communicate with a user through a control interface 358 and a display interface 353 coupled to the display 354. The display 354 may be, for example, a Thin-Film-Transistor Liquid Crystal Display (TFT) display, an Organic Light Emitting Diode (OLED) display, or other appropriate display technology. The display interface 353 may include appropriate circuitry for driving the display 354 to present graphical and other information to a user. The control interface 358 may receive commands from a user and convert them for submission to the processor 352. In addition, an external interface 332 may provide communication with the processor 352, so as to enable near area communication of the mobile computing device 350 with other devices. The external interface 332 may provide, for example, for wired communication in some implementations, or for wireless communication in other implementations, and multiple interfaces may also be used.

The memory 334 stores information within the mobile computing device 350. The memory 334 can be implemented as one or more of a computer-readable medium or media, a volatile memory unit or units, or a non-volatile memory unit or units. An expansion memory 374 may also be provided and connected to the mobile computing device 350 through an expansion interface 372. The expansion memory 374 may provide extra storage space for the mobile computing device 350, or may also store applications or other information for the mobile computing device 350. Specifically, the expansion memory 374 may include instructions to carry out or supplement the processes described above, and may include secure information also.

The memory may include, for example, flash memory and/or non-volatile random access memory (NVRAM), as discussed below. In some implementations, instructions are stored in an information carrier. The instructions, when executed by one or more processing devices, such as processor 352, perform one or more methods, such as those described above. The instructions can also be stored by one or more storage devices, such as one or more computer-readable or machine-readable media, such as the memory 334, the expansion memory 374, or memory on the processor 352. In some implementations, the instructions can be received in a propagated signal, for example over the transceiver 338 or the external interface 332.

The mobile computing device 350 may communicate wirelessly through the communication interface 333, which may include digital signal processing circuitry where necessary. The communication interface 333 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 338 using a radio frequency. In addition, short-range communication, such as using a Bluetooth or Wi-Fi, may occur. In addition, a Global Positioning System (GPS) receiver module 370 may provide additional navigation- and location-related wireless data to the mobile computing device 350, which may be used as appropriate by applications running on the mobile computing device 350.

The mobile computing device 350 may also communicate audibly using an audio codec 330, which may receive spoken information from a user and convert it to usable digital information. The audio codec 330 may likewise generate audible sound for a user, such as through a speaker, e.g., in a handset of the mobile computing device 350.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program can be written in any form of programming language, including compiled or interpreted languages, or declarative or procedural languages; and it can be deployed on a system of one or more computers in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

receiving, from application programming interfaces (APIs) associated with one or more utility services providers, energy consumption data for each of a plurality of cell sites of a radio access network (RAN);

accessing a machine learning model trained to determine, based on the energy consumption data, one or more operating parameters of the cell sites, the one or more operating parameters being indicative of corresponding usage levels of each of the plurality of cell sites;

determining, based on an output of the machine learning model, a power resource configuration for the plurality of cell sites, the power resource configuration specifying, for each of the plurality of cell sites, whether the corresponding cell site can be powered by a renewable energy source during a period of time; and transmitting, via at least a subset of the APIs, a signal that identifies the power resource configuration, the signal including a recommendation to switch at least one of the plurality of cell sites from a non-renewable energy source to the renewable energy source.

2. The method of claim 1, wherein receiving from APIs associated with one or more utility services providers, energy consumption data for each of a plurality of cell sites of a RAN comprises, receiving data on a periodic basis, that indicates energy usage and site load information.

3. The method of claim 1, wherein receiving from APIs associated with one or more utility services providers, energy consumption data for each of a plurality of cell sites of a RAN comprises, receiving data that indicates whether energy consumed is non-renewable energy or renewable energy.

4. The method of claim 1, wherein at least a first subset of the APIs associated with one or more utility service providers are configured to communicate with a control center associated with a utility service provider.

5. The method of claim 1, wherein at least a second subset of the APIs associated with one or more utility service providers are configured to communicate directly with one or more smart meters located at one or more cell sites of the RAN.

6. The method of claim 1, wherein determining, based on an output of the machine learning model, a power resource configuration for the plurality of cell sites comprises determining a power resource configuration that would reduce a load on a particular grid within the RAN, wherein the particular grid includes a subset of the plurality of cell sites.

7. The method of claim 1, further comprising analyzing the energy consumption data for each of the plurality of cell sites of the RAN to identify power consumption trends, trends in bands deployed by a RAN solution engine associated with the plurality of cell sites, and cell site traffic trends.

8. The method of claim 1, comprising:

transmitting a control signal to a particular cell site, wherein the control signal is configured to implement a band configuration at the particular cell site.

9. The method of claim 1, wherein the one or more operating parameters being indicative of corresponding usage levels of each of the plurality of cell sites comprises renewable energy usage, non-renewable energy usage, total daily energy consumption, site load information, daily cell site traffic trends, and daily band deployment trends.

10. A system comprising:

one or more computers and one or more storage devices on which are stored instructions that are operable, when executed by the one or more computers, to cause the one or more computers to perform operations comprising:

receiving, from application programming interfaces (APIs) associated with one or more utility services providers, energy consumption data for each of a plurality of cell sites of a radio access network (RAN);

accessing a machine learning model trained to determine, based on the energy consumption data, one or more operating parameters of the cell sites, the one or more operating parameters being indicative of corresponding usage levels of each of the plurality of cell sites;

determining, based on an output of the machine learning model, a power resource configuration for the plurality of cell sites, the power resource configuration specifying, for each of the plurality of cell sites, whether the corresponding cell site can be powered by a renewable energy source during a period of time; and transmitting, via at least a subset of the APIs, a signal that identifies the power resource configuration, the signal including a recommendation to switch at least one of the plurality of cell sites from a non-renewable energy source to the renewable energy source.

11. The system of claim 10, wherein receiving from APIs associated with one or more utility services providers, energy consumption data for each of a plurality of cell sites of a RAN comprises, receiving data on a periodic basis, that indicates energy usage and site load information.

12. The system of claim 10, wherein receiving from APIs associated with one or more utility services providers, energy consumption data for each of a plurality of cell sites of a RAN comprises, receiving data that indicates whether energy consumed is non-renewable energy or renewable energy.

13. The system of claim 10, wherein at least a first subset of the APIs associated with one or more utility service providers are configured to communicate with a control center associated with a utility service provider.

14. The system of claim 10, wherein at least a second subset of the APIs associated with one or more utility service providers are configured to communicate directly with one or more smart meters located at one or more cell sites of the RAN.

15. The system of claim 10, wherein determining, based on an output of the machine learning model, a power resource configuration for the plurality of cell sites comprises determining a power resource configuration that would reduce a load on a particular grid within the RAN, wherein the particular grid includes a subset of the plurality of cell sites.

16. The system of claim 10, wherein the operations comprise analyzing the energy consumption data for each of the plurality of cell sites of the RAN to identify power consumption trends, trends in bands deployed by a RAN solution engine associated with the plurality of cell sites, and cell site traffic trends.

17. The system of claim 10, wherein the operations comprise:

transmitting a control signal to a particular cell site, wherein the control signal is configured to implement a band configuration at the particular cell site.

18. The system of claim 10, wherein the one or more operating parameters being indicative of corresponding usage levels of each of the plurality of cell sites comprises renewable energy usage, non-renewable energy usage, total daily energy consumption, site load information, daily cell site traffic trends, and daily band deployment trends.

19. One or more non-transitory computer storage media encoded with computer program instructions that when executed by one or more computers cause the one or more computers to perform operations comprising:

receiving, from application programming interfaces (APIs) associated with one or more utility services providers, energy consumption data for each of a plurality of cell sites of a radio access network (RAN);

accessing a machine learning model trained to determine, based on the energy consumption data, one or more operating parameters of the cell sites, the one or more operating parameters being indicative of corresponding usage levels of each of the plurality of cell sites;

determining, based on an output of the machine learning model, a power resource configuration for the plurality of cell sites, the power resource configuration specifying, for each of the plurality of cell sites, whether the corresponding cell site can be powered by a renewable energy source during a period of time; and transmitting, via at least a subset of the APIs, a signal that identifies the power resource configuration, the signal including a recommendation to switch at least one of the plurality of cell sites from a non-renewable energy source to the renewable energy source.

20. The one or more non-transitory computer storage media of claim 19, wherein receiving from APIs associated with one or more utility services providers, energy consumption data for each of a plurality of cell sites of a RAN comprises, receiving data on a periodic basis, that indicates energy usage and site load information.

* * * * *